F. MAXANT.
SHAFT AND AXLE BEARING.
APPLICATION FILED MAR. 31, 1910.
991,868. Patented May 9, 1911
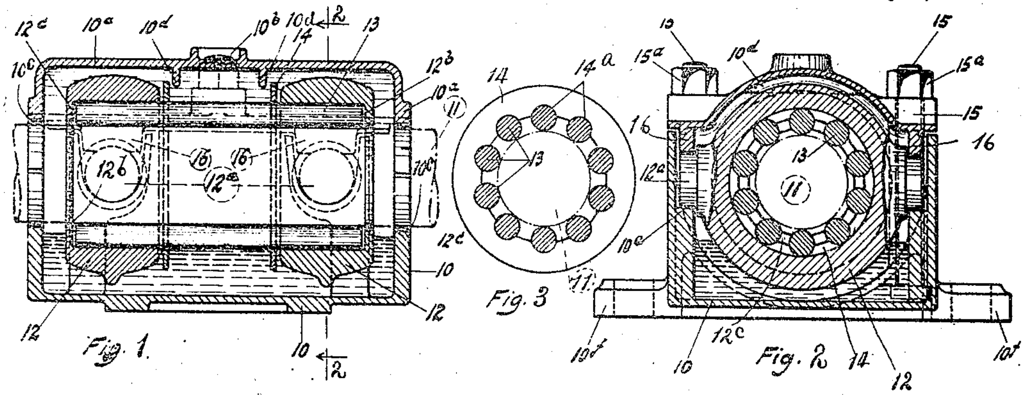
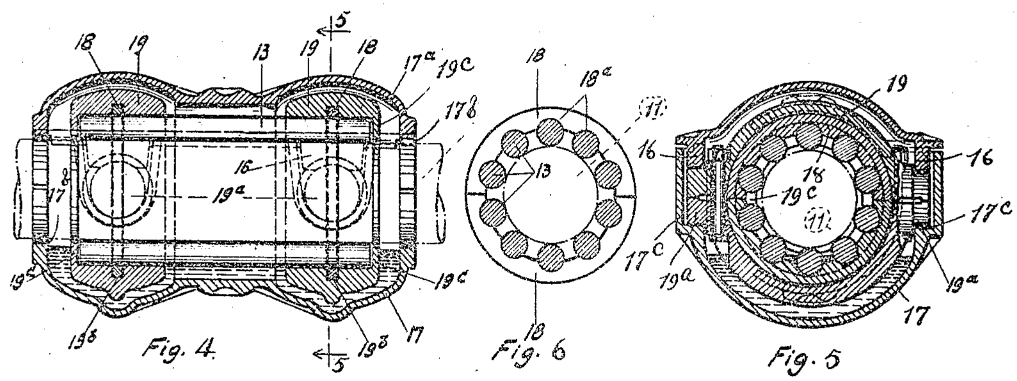
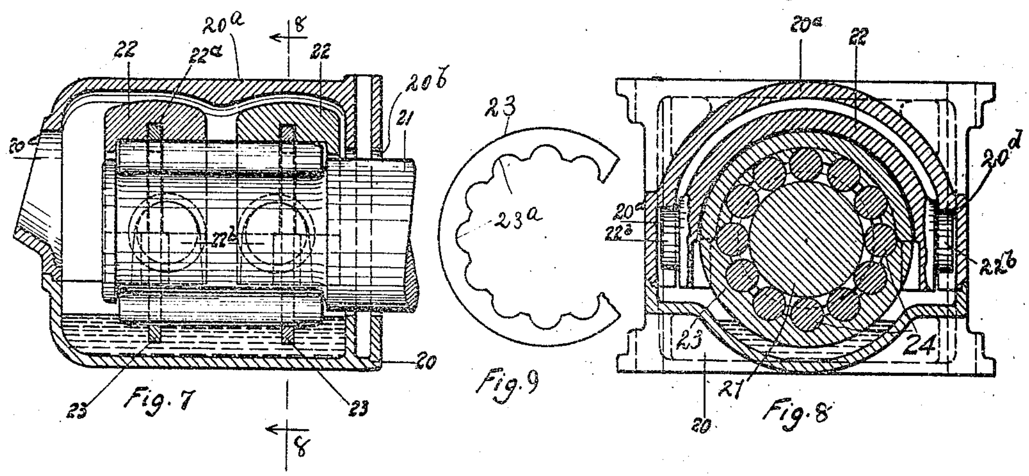
WITNESSES:
Chas. F. Bassett
M. A. Milord
INVENTOR
Frank Maxant
BY
Frederick Benjamin
ATTORNEY

UNITED STATES PATENT OFFICE.

FRANK MAXANT, OF CHICAGO, ILLINOIS, ASSIGNOR OF ONE-HALF TO BASIL MAXANT, OF CHICAGO, ILLINOIS.

SHAFT AND AXLE BEARING.

991,868. Specification of Letters Patent. Patented May 9, 1911.

Application filed March 31, 1910. Serial No. 552,596.

*To all whom it may concern:*

Be it known that I, FRANK MAXANT, a subject of the Emperor of Germany and citizen of Austria-Hungary, residing at Chicago, in the county of Cook and State of Illinois, have invented certain new and useful Improvements in Shaft and Axle Bearings, of which the following is a specification.

This invention relates to improvements in roller bearings for shafts, car axles, etc. and the especial object of the improvements which form the subject matter of this application for patent are as follows:—to provide a roller bearing in which the members supporting the rollers will automatically adjust themselves to any variation or deviation in the shaft or axle relative to the journal box carrying said bearings; to provide a journal bearing which may be kept constantly supplied with oil and in which the oil will be fed to all parts of the axle or shaft and the elements engaging same within the journal box; in which the rollers may be free to rotate independently of each other and at the same time be held in a fixed spaced relation to each other; in which the journal box may be applied to a shaft from the sides of the shaft as distinguished from being slid endwise over the shaft.

In carrying out the foregoing and other objects of general utility, I have produced a split journal box with which I have combined bearing rings so mounted within the box as to freely swing on a horizontal axis, and have arranged in said bearing-rings, rollers which may rotate independently of each other and be free to change their relative positions within the journal box.

The particular improvements embodied in this application are modifications of bearings shown and described in my co-pending application under Serial Number 530,431.

In the accompanying drawing which forms a part of this application, I have shown a preferred and a modified adaptation of my invention in the following views:—

Figure 1 is a longitudinal section taken through a roller bearing with its inclosing box of a form adapted for use with line shafting; Fig. 2 is a transverse section through Fig. 1 on the line 2—2; Fig. 3 is a view in elevation of one of the retaining rings which form a feature of my invention, the rollers being shown in cross-section; Fig. 4 is a longitudinal section showing a slightly modified form of journal box and a modified arrangement of the roller retaining rings; Fig. 5 is a cross-section through Fig. 4 on the line 5—5; Fig. 6 is an elevational view of roller retaining rings formed in two sections; Fig. 7 is a longitudinal section through a car axle box showing a fragment of a car axle with my improved roller bearing applied thereto; Fig. 8 is a cross-section through Fig. 7 on the line 8—8, and Fig. 9 is an elevation of a portion of one of the roller retaining rings.

Referring to Figs. 1 to 3 inclusive, the numerals 10 and $10^a$, represent respectively, the lower and upper sections of a journal box, which have interfitting edges, and are provided with openings $10^c$ for a shaft 11, indicated in dotted lines in Fig. 1. $10^b$ represents an opening in the upper section $10^a$ for the introduction of oil. $10^d$ represents depending lugs formed on the inner walls of the upper section $10^a$ for a purpose to be disclosed. 12 represents a roller-supporting collar or ring which has on opposite sides, trunnions $12^a$ which are journaled in suitable recesses $10^e$ in the box section 10. These rings are recessed at $12^b$ to receive the end portions of the roller 13. The overhanging portion $12^c$ prevents endwise movement of the rollers 13 in the direction of said shoulder. Spacing rings 14 are formed with grooves $14^a$ in their inner edge, in which grooves are seated the rollers 13. One of these spacing rings is placed between each of the roller carriers 12 and the adjacent lug $10^d$ thereby preventing displacement of said rings. The lower box-section 10 is formed with lugs $10^f$ having holes to receive suitable attaching bolts. Both sections 10, and $10^a$, have registering vertical openings $15^b$ therethrough to receive the bolts 15 which connect the two sections together. The heads of these bolts lie in suitable recesses formed in the under side of the box section 10 and their threaded upper ends project above the top of the section 10ª and are supplied with nuts 15ª. Cover extensions 16 fit over the upper sides of the trunnions and have a close fit or connection with the side edges of the box section 10ª, as shown at the left hand of Fig. 2.

Referring now to Figs. 4 to 6 inclusive, the journal-box is of somewhat different design from that shown in Fig. 1. It is formed in a lower semi-cylindric section 17 and an upper semi-cylindric section 17ª which fit together and may be held in operative relation in any desired manner. The inner walls of the box sections are curved and recessed to conform to the peripheral contour of the bearing collars 19 placed therein, the ends of the box are open as at 17ᵇ for the passage of the shaft 11, and the side walls of the section 17 have recesses 17ᶜ to receive the trunnions 19ª of said collars. Each collar 19 has an annular groove 19ᵇ cut in its inner face about midway its sides, and in this groove is placed a spacing ring which, in this instance, is formed in two semi-circular sections 18. These ring sections have recesses 18ª cut in their inner edges to receive and retain in proper spaced relation, the rollers 13. The collars have shoulders 19ᶜ on their outer edges corresponding in form and function to the shoulders 12ᶜ above described. The rollers 13 and the extensions 16 are constructed and arranged in the manner already pointed out. In this form of journal box, the sections may be applied to a shaft at any point and when in place be supported by any suitable hanger that will embrace the sections. Inasmuch as the spacing rings are seated in the internal grooves of the collars, the rings cannot be displaced so long as the shaft is in its bearings between the rollers 13.

Referring to Figs. 7 to 9 inclusive, I have substituted a car-axle, and car-axle box for the journal boxes and shafts of Figs. 1 to 6 inclusive, have omitted the lower portion of the collars as it is superfluous in this type of journal bearing, the thrust being always upward, and have dispensed with the pillow-blocks. The axle-boxes are of a well-known form, but are made in a lower section 20 and an interfitting upper section 20ª, with the passage 20ᵇ at one end for the axle 21, and an opening 20ᶜ at the opposite end to insert the usual packing and lubricant. The collars 22 are somewhat more than semi-cylindric, the segment removed being on a line below the axis of the axle. A groove 22ª is cut in the inner face of these collars to receive so much of the rings 23 as may be seated therein. These rings carry the rollers 24 in grooves 23ª in the manner above described in connection with the rings 14. Trunnions 22ᵇ are formed at opposite sides of the collars, and fit in suitable recesses 20ᵈ in the box section 20ª. The rollers 24 are rounded at their ends which abut against the shoulder usually formed on car-axles of the type shown. It will be obvious that oil placed in the lower sections of each of the boxes shown, will come into contact with all of the rollers, when it is appreciated that the roller carrying rings are free to rotate in the grooves in which they are seated. It will also be apparent that as the collars may rock freely in their trunnion-bearings, they will instantly and automatically adjust themselves to any change in the vertical alinement of the shaft or axle carried by said collars, hence undue friction is entirely avoided in a bearing constructed as described.

I do not limit myself in this connection to any particular design of journal box, as any such box having bearings for the trunnions of my improved shaft carrying collars, and adapted to receive or contain a suitable lubricant, may be utilized in combination with the novel features which go to make up the essence of my invention.

What I claim is:—

1. In a journal bearing, in combination with a box, adapted to receive lubricant therein, collars rockably mounted in said box, anti-friction devices arranged in said collars and means retaining said devices in a fixed spaced relation to each other.

2. In a journal bearing, in combination with a box adapted to receive a lubricant therein, collars independently and rockably mounted in said box, rollers arranged in spaced relation in said collars and common thereto and means for retaining said rollers in said relation, said means adapted to rotate in said collars.

3. In a journal-bearing in combination with a box adapted to contain a lubricant, collars having lateral horizontal bearings within said box, rollers having bearings in said collars, and rotatable means for holding said rollers in spaced relation to each other.

4. In a journal-bearing, in combination with a box made in sections and adapted to contain lubricant, collars having horizontal trunnions journaled in said boxes, rollers having side and end bearings in said collars, and means for retaining said rollers in spaced relation to each other.

5. In a journal bearing, in combination with suitable supporting means, collars having trunnions journaled in said supporting means, rollers having side and end bearings in said collars, rotatable means carrying said rollers, and adapted to apply lubricant to said rollers.

6. In a journal-bearing, a box, collars rockably mounted in said box, retaining rings rotatably mounted in said collars, and rollers rotatably mounted in said rings.

7. In a journal bearing, a box having recesses in its inner side walls, a collar having trunnions seated in said recesses, and an inwardly extending flange, anti-friction members bearing on the inner walls of said collar and flange, and means for supporting and rotating said members relative to said collar.

In testimony whereof I affix my signature in the presence of two witnesses.

FRANK MAXANT.

Witnesses:
CHAS. F. BASSETT,
M. A. MILORD.